United States Patent
Tverskoy et al.

(10) Patent No.: US 6,341,160 B2
(45) Date of Patent: *Jan. 22, 2002

(54) ANSWERING MACHINE FOR TRANSMITTING MESSAGES TO REMOTELY ACCESSIBLE USER ACCOUNT

(76) Inventors: Boris S. Tverskoy, 351 Edlee Ave., Palo Alto, CA (US) 94306; Vladimir A. Gurevich, 5065 Shalimar Cir., Fremont, CA (US) 94555

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,516

(22) Filed: Apr. 14, 1998

(51) Int. Cl.[7] .......................... H04M 11/00; H04M 1/64
(52) U.S. Cl. ............................... 379/88.13; 379/88.17; 379/88.22; 379/908
(58) Field of Search .......................... 379/88.12, 88.13, 379/88.14, 352, 353, 355, 356, 359, 908, 904, 88.22, 93.24, 88.17, 67.1, 100.08, 102.01, 93.1, 88.26, 900, 93.01; 709/206

(56) References Cited

U.S. PATENT DOCUMENTS

| | | | | |
|---|---|---|---|---|
| 5,530,740 A | * | 6/1996 | Irribarren et al. | 379/88.17 |
| 5,557,659 A | * | 9/1996 | Hyde-Thomson | 379/88.13 |
| 5,568,540 A | * | 10/1996 | Greco et al. | 379/88.25 |
| 5,608,786 A | * | 3/1997 | Gordon | 379/352 |
| 5,737,395 A | * | 4/1998 | Irribarren | 379/88.13 |
| 5,999,594 A | * | 12/1999 | Mizoguchi et al. | 379/88.14 |
| 6,052,442 A | * | 4/2000 | Cooper et al. | 379/88.19 |
| 6,072,861 A | * | 6/2000 | Yu | 379/88.14 |
| 6,085,231 A | * | 7/2000 | Agraharam et al. | 709/206 |

OTHER PUBLICATIONS

Onebox.com |Free Voicemail, Emall and Fax—All in One Place![online], Onebox.com, 1999–2001 [retrieved on Sep. 28, 2001]. Retrieved from the Internet: <URL: http://www.onebox.com>.*

Jfax.com—Fax, voice mail, email. The leader in unified messaging [online], Jfax.com, 1998 [retrieved on Jun. 3, 1998]. Retrieved from the Internet: <URL: http://www.jfax.com>.*

* cited by examiner

*Primary Examiner*—Fan Tsang
*Assistant Examiner*—Ovidio Escalante
(74) *Attorney, Agent, or Firm*—Skjerven Morrill MacPherson LLP

(57) ABSTRACT

An electronically accessible answering machine is disclosed. The answering machine includes a memory that stores a voice message from a caller. The answering machine also includes a control system that stores information associated with a user account, including a telephone number associated with a user account provider. The control system dials the telephone number associated with the user account provider and transmits selected portions of the information associated with the user account to the user account provider to obtain access to the user account. The control system accesses the memory and generates an electronic mail message including the voice message.

16 Claims, 2 Drawing Sheets

ANSWERING MACHINE FOR TRANSMITTING MESSAGES TO REMOTELY ACCESSIBLE USER ACCOUNT

FIELD OF INVENTION

The present invention relates generally to telephone answering machines and more particularly to an electronically accessible answering machine.

BACKGROUND OF THE INVENTION

A digital answering machine is used to answer a telephone and store voice messages in an internal memory. The use of an internal digital memory eliminates the need for the magnetic tape cassette that was commonly used in earlier answering machines.

The answering machine may be accessible by the owner when he or she is away from home. The owner may call his or her home telephone number, wait for the answering machine to answer the call, and then enter a DTMF access code. If the answering machine recognizes the access code, it will allow the user to retrieve messages, delete messages, turn the machine on or off, and perform other control functions.

The answering machine may include a "toll saver" feature, which allows the user to determine whether any messages have been left on the machine without completing a telephone call to the machine. This feature allows the user to save long distance charges, cellular air time charges or other charges for completing the telephone call. However, this feature does not enable the user to listen to messages that have been left on the answering machine or perform other control functions without incurring telephone connection charges, because the answering machine must answer the telephone call in order for the user to perform these functions.

SUMMARY OF THE INVENTION

Therefore a need has arisen for an answering machine that can provide access to voice messages and control functions without the completion of a telephone call to the answering machine.

Accordingly, an electronically accessible answering machine is disclosed. The answering machine includes a memory that stores a voice message from a caller. The answering machine also includes a control system that stores information associated with a user account, including a telephone number associated with a user account provider. The control system dials the telephone number associated with the user account provider and transmits selected portions of the information associated with the user account to the user account provider to obtain access to the user account. The control system accesses the memory and generates an electronic mail message including the voice message.

A technical advantage of the present invention is that voice messages may be retrieved from a remote location without placing a telephone call to the answering machine. Another technical advantage is that commands may be sent to the answering machine from a remote location without placing a telephone call to the answering machine.

DETAILED DESCRIPTION OF THE PREFERRED EMBODIMENTS

Figure 1:
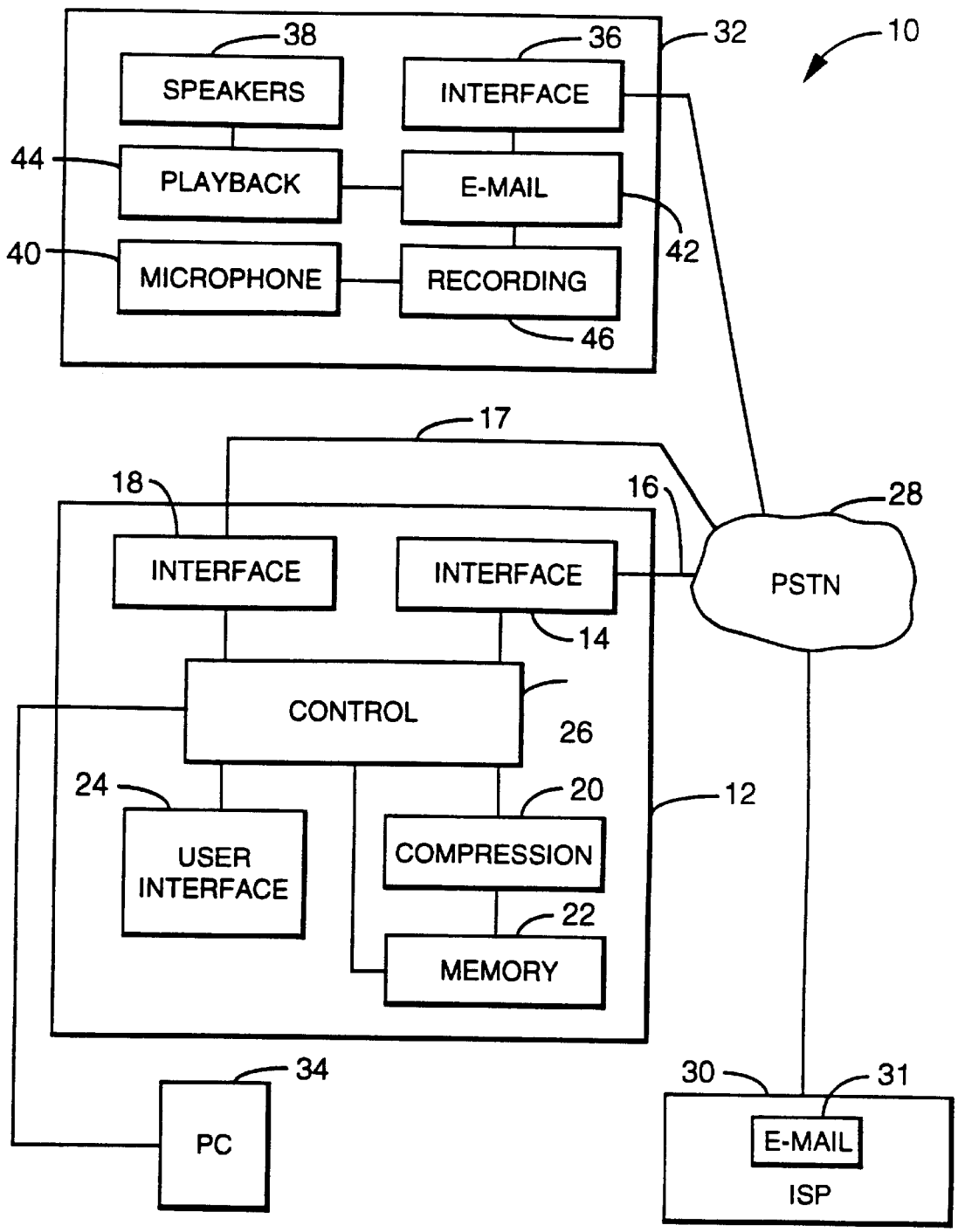
FIG. 1 is a block diagram of a telephone network including an electronically accessible answering machine in accordance with the present invention.

Referring to FIG. 1, a telephone network 10 including an answering machine 12 constructed in accordance with the present invention is shown. Answering machine 12 allows a user to remotely access answering machine 12 and retrieve voice messages via e-mail, as will be described in detail below. Answering machine 12 also allows the user to send commands to answering machine 12 via e-mail, as will be described in detail below.

Answering machine 12 includes a telephone line interface 14 connected to a telephone line 16. Answering machine 12 also includes a computer-telephone interface 18, a voice signal digitization and compression system 20, a digital memory 22, a user interface system 24, and a control system 26 that controls the operation of answering machine 12. Control system 26 may, for example, comprise software loaded and executed on a microprocessor (not shown) within answering machine 12.

Telephone line interface 14 is connected to telephone line 16, which is in turn connected to a publicly switched telephone network (PSTN) 28. Telephone line 16 may be, for example, a plain old telephone service (POTS) line or ISDN line representing the user's primary home telephone number. Answering machine 12 also has a computer-telephone interface 18 connected to a second telephone line 17. Computer-telephone interface 18 may be, for example, a modem capable of sending digital information over a POTS line. Alternatively, telephone line 17 may be an ISDN line, with computer-telephone interface 18 providing the appropriate communications interface. It will also be understood from the following description that the user need not have a second telephone line 17 in his or her home. Instead, computer-telephone interface 18 could be directly connected to the user's primary telephone line 16.

Also connected to PSTN 28 are an Internet service provider (ISP) 30, with which the user has an electronic mail (e-mail) account 31, and a personal computer 32 with which the user can access the Internet service provider 30. It will be understood that, while an Internet service provider 30 is utilized herein for illustrative purposes, Internet service provider 30 may alternatively be any account provider supplying access to an electronic mail account or other messaging system on a private or public computer network.

Initially, the user may set parameters for the operation of answering machine 12. For example, the user may set the number of rings after which answering machine 12 will answer an incoming call. The user may also input information such as the telephone number of the Internet service provider 30, the user's e-mail account identification and password, and other information which answering machine 12 will utilize in a manner described below. This information is input by means of a personal computer 12 connected to answering machine 12. Personal computer 34 may be connected to answering machine 34 through, for example, an RS-232 or infrared port (not shown) in answering machine 12. Some of the information may be input by means of user interface system 24, which will be described more fully below. The information received from personal computer 34 or user interface system 24 may be stored in digital memory 22, or alternatively may be stored in an internal memory (not shown) in control system 26.

User interface system 24 includes interface features common to answering machines, such as a speaker for playing messages and an internal microphone for recording outgoing messages and memos. User interface system 24 also includes message playback control buttons such as "play," "stop," "store" and "delete." User interface system 24 may also include a "memo" button to allow a user to record a message as a reminder or for another member of the household. In addition, user interface system 24 includes a "connect" button, the purpose of which will be described more fully below. It will be understood that user interface system 24 may also include well known control features not specifically mentioned herein, such as buttons for setting an internal clock and so forth.

When an incoming call is received on telephone line 16, the ringing current is detected by telephone line interface 14 and communicated to control system 26. Answering machine 12 then functions as a digital answering machine. After a certain number of rings (specified by the user as previously described), if the telephone call has not been answered, control system 26 causes telephone line interface 14 to go off-hook. Answering machine 12 thereby answers the call. Control system 26 accesses the announcement previously stored by the user in digital memory 22 and plays the announcement to the caller. After the announcement is played, a tone indicates to the caller that a message may now be recorded on answering machine 12. The voice signals of the caller's message are digitized and compressed by voice signal digitization and compression system 20. The compressed voice data is stored in digital memory 22 as a message. After the caller hangs up, control system 26 causes telephone line interface 14 to go on-hook, and answering machine 12 waits to receive another incoming call.

Control system 26 may store other information in digital memory 22 in association with the compressed voice data. For example, before answering machine 12 answers the incoming call, Caller ID or other caller identification information may be received by answering machine 12. Control system 26 may store the caller identification information in digital memory 22. The caller identification information will typically be associated with a message in digital memory 22. However, at the user's option, control system 26 may store caller identification information from all incoming calls in digital memory 22, even if a caller hangs up without leaving a message. Other information may also be stored in digital memory 22, such as the time and date of the call as determined by an internal clock (not shown) in control system 26.

Answering machine 12 provides the user with access to stored voice messages and other information via electronic mail. To provide this access, answering machine 12 sends and receives electronic mail messages to and from the user. The process by which this is accomplished will now be described.

Figure 2:
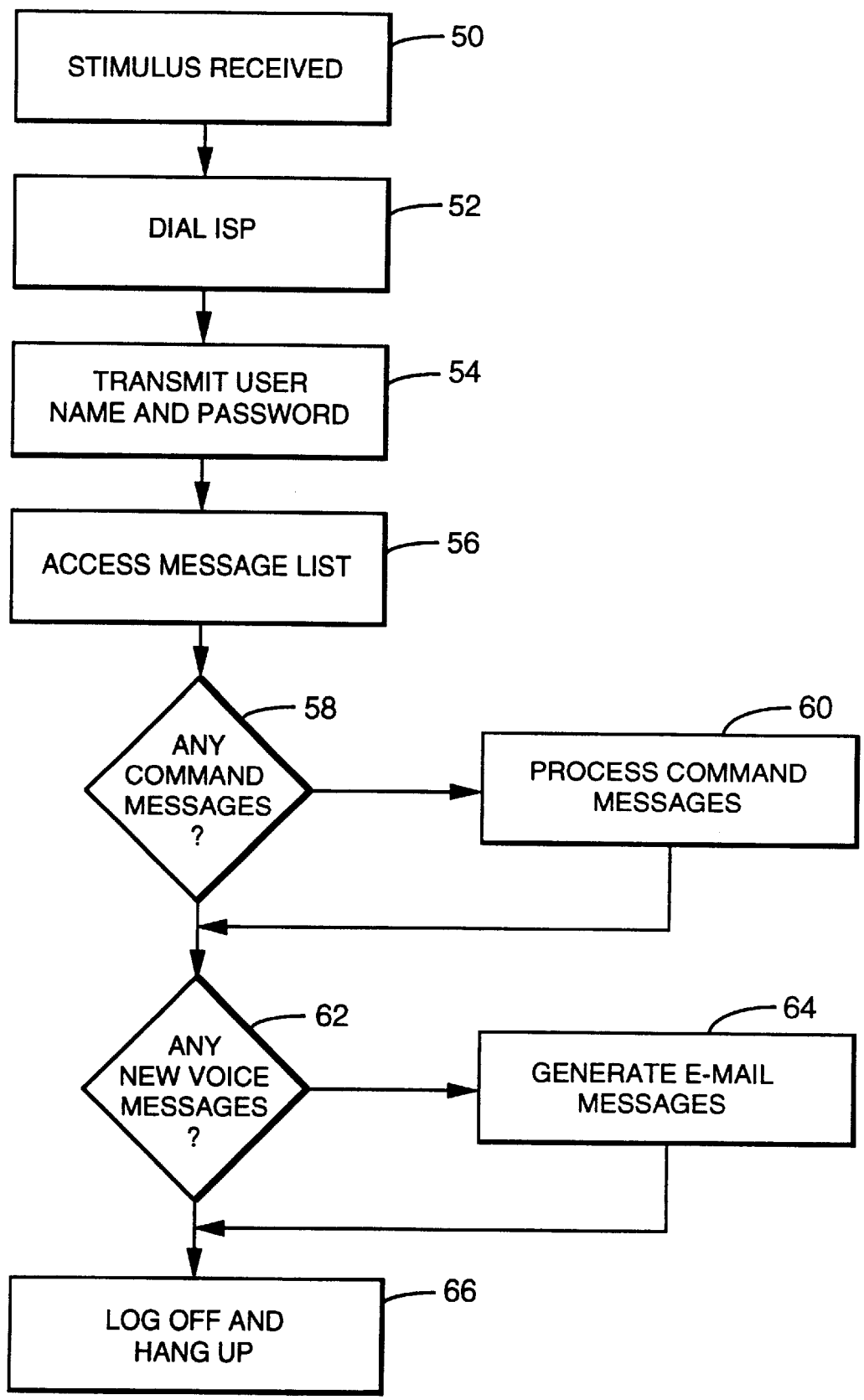
FIG. 2 is a flowchart illustrating the operation of the electronically accessible answering machine.

Referring to FIG. 2, a flowchart illustrating the operation of answering machine 12 is shown. At step 50, answering machine 12 receives a stimulus to call the user's Internet service provider 30. This stimulus may be provided by any one of several sources. For example, when setting parameters for answering machine 12, the user may select an option whereby answering machine 12 will call ISP 30 after a certain number (N) of messages are received. The stimulus is therefore provided when answering machine 12 receives the Nth message. Alternatively, the user may select an option whereby answering machine 12 calls ISP 30 at a specified time interval, in which case the stimulus is provided by the expiration of an internal timer (not shown) within control system 26. The user may also select an option whereby answering machine 12 calls ISP 30 after receiving a call with a designated number of rings followed by a hang-up. Thus, the user may prompt answering machine 12 to call ISP 30 by calling his or her own telephone number from a remote location, letting the telephone ring a designated number of times, for example twice, and hanging up. With this method, the user is able to prompt answering machine 12 to call ISP 30 at any time without incurring any long distance or other call connection charges. Finally, user interface system 24 includes a "connect" button which, when pressed, causes answering machine 12 to call ISP 30. This also provides on-demand connection to ISP 30, but requires that someone be present at answering machine 12 to press the "connect" button.

When a stimulus to call the user's Internet service provider has been received at step 50, control system 26 causes computer-telephone interface 18 to go off-hook and dial the telephone number for ISP 30 as previously input by the user during setup. Thus, at step 52, a connection to ISP 30 is established. At step 54, control system 26 to transmits the user's electronic mail account information, such as a user name and password, to ISP 30, thereby gaining access to the user's e-mail account 31.

When access to e-mail account 31 has been obtained, control system 26 communicates with ISP 30 through the use of commands complying with the protocol accepted by ISP 30. For example, control system 26 may use commands compliant with the well known POP-3 protocol to manipulate the user's e-mail account 31. Alternatively, ISP 30 may use the newer IMAP protocol. The protocol used by ISP 30 may be specified by the user during setup of answering machine 12.

At step 56, control system 26 retrieves a list of new e-mail messages in the user's account 31 to determine whether any commands have been sent to answering machine 12 via e-mail. For example, control system 26 may use the TOP command in the POP-3 protocol to retrieve the headers of any e-mail messages without retrieving the messages themselves.

At step 58, control system 26 examines the headers to determine whether any command messages are present. The format and content of command messages will be described below. If command messages are present, control system 26 processes the command messages at step 60 in a manner to be described below.

When control system 26 is finished processing command messages, or if no command messages were detected, then control system 26 proceeds to step 62. At this step, control system 26 determines whether there are any new voice messages stored in memory 22. If new voice messages are detected, then control system 26 proceeds to step 64.

The user may have selected, during setup of answering machine 12, the option to receive e-mail notification of calls received on telephone line 16 for which no voice message was left on answering machine 12. If the user has selected this option, then control system 26 also determines at step 62 whether there is caller identification information or other call information stored in memory 22 associated with such "hang-up" calls. If any new voice messages or call information is stored in memory 22, then control system 26 proceeds to step 64.

At step 64, control system 26 generates e-mail messages corresponding to the information stored in memory 22. Specifically, control system 26 generates an e-mail message for each voice message stored in memory 22. Each e-mail message has a header conveying information about the voice message. For example, the header may include the date and time of the call, as well as the caller identification information, if any, that was received with the call. Attached to the e-mail message is a file containing a digital representation of the voice message left by the caller. The attached file may, for example, include a voice message in the well known .WAV format or some other audio format. To create the attached file, control system 26 translates the compressed voice data stored in memory 22 into another audio format. Alternatively, if the user has appropriate playback software at personal computer 32, then the attached file may contain compressed voice data taken directly from memory 22. This file is attached using, for example, standard MIME format.

As previously stated, the user may have selected, during setup of answering machine 12, the option to receive e-mail notification of "hang-up" calls as well as voice messages. If so, then control system 26 generates an e-mail message for each incoming call received on telephone line 16, regardless of whether a voice message was left on answering machine 12. The e-mail message corresponding to a "hang-up" call includes call information such as date, time and caller identification information in the header, with no attached voice message file.

Any e-mail messages generated at step 64 are sent to the user's own e-mail account 31 at ISP 30. The messages are addressed using a standard protocol, such as SMTP. Thus, the user may retrieve the e-mail messages at the same e-mail account from which the messages were sent, as will be described more fully below.

After sending the e-mail messages at step 64, or if control system 26 determined at step 62 that there were no new voice messages to generate e-mail messages for, then control system 26 proceeds to step 66. At this step, control system 26 terminates the session with ISP 30 by logging off the user's e-mail account 31. Control system 26 also causes computer-telephone interface 18 to go on-hook or otherwise terminate the telephone connection with ISP 30. When another stimulus to call ISP 30 is received by answering machine 12, the above process is repeated.

Returning to FIG. 1, the user may access his or her e-mail account 31 at ISP 30 at any time from personal computer 32 to check for new messages. Personal computer 32 includes a computer-telephone interface 36, one or more speakers 38 and a microphone 40. Personal computer 32 also includes e-mail software 42 that provides an interface with the user's e-mail account 31 at ISP 30. E-mail software 42 may be, for example, Microsoft Mail, cc:Mail or any other e-mail software. Playback software and hardware 44 is capable of playing audio messages over speakers 38, and may include, for example, a SoundBlaster audio card. Recording software and hardware 46 is capable of digitizing and storing voice signals received from microphone 40.

When the user logs on to his or her e-mail account 31 at ISP 30, e-mail software 42 displays any new or old e-mail messages for the user. The user may determine, from the headers of new e-mail messages, whether any such messages contain voice messages from answering machine 12. The user may view the call information in the e-mail message header and play the voice message over speakers 38 via playback software and hardware 44.

The user may also generate e-mail messages containing commands to be executed by answering machine 12. These command messages will be retrieved by answering machine 12 the next time it accesses the user's e-mail account 31. Each command message includes a specially designated header indicating that the e-mail message contains a command. Thus, at step 58 shown in FIG. 2, answering machine 12 may easily determine whether any of the messages in the user's e-mail account 31 are command messages by examining the headers of the e-mail messages. The specially designated command header may be any arbitrary character string that would not normally appear in an e-mail message header. The command itself, including any required or optional arguments relating to the command, are contained in the body of the e-mail message. Each command message may include one or more commands to be executed sequentially by answering machine 12.

For example, one command that may be sent by e-mail to answering machine 12 is a "delete message" command. This command causes answering machine 12 to delete specified voice messages from memory 22. This command may be followed by a list or range of numbers indicating the voice messages to be deleted from memory 22. Thus, if the user receives an e-mail message containing a voice message designated as "Message 1" by answering machine 12, the user may generate an e-mail message having the designated command header and the command "delete message 1" in the body of the e-mail message.

Another example of a command that may be sent by e-mail is a "change answering options" command. This command may be used to change various options that were selected by the user during setup of answering machine 12, such as the number of rings after which answering machine 12 will answer an incoming call. This command may also be used to turn answering machine 12 on or off.

Another exemplary command is a "change security code" command. Answering machine 12 may be programmed with a security code allowing the user to retrieve messages over the telephone in a traditional manner. To retrieve voice messages in this manner, the user dials his or her home telephone number, waits for answering machine 12 to answer the call, and enters a predetermined sequence of DTMF tones as a security code, at which point answering machine 12 allows the user to retrieve messages and execute other commands using DTMF signals. The "change security code" e-mail command allows the user to change the DTMF tone sequence used as a security code. This command may require the user to enter the previous security code before allowing the user to change the security code. Thus, the command format may be, for example, "change security code <old security code><new security code><new security code [verification]>."

Yet another command that may be sent by e-mail is a "store message" command. This command allows the user to store a recorded voice message file in memory 22 without calling answering machine 12. Thus the user records a voice message file using microphone 30 and recording hardware and software 46 on personal computer 32. The user attaches the voice message file to an e-mail message with the designated command header and the "store message" command in the body of the e-mail message. Upon receipt of this e-mail message, control system 26 stores the attached voice message file, with or without translation, as a new voice message in memory 22.

Likewise, a "change announcement" message may be used to change the outgoing announcement on answering machine 12. As with the "store message" command, the user records a voice message file at personal computer 32 and attaches the file to an e-mail command message, this time with the "change announcement" command in the body of the e-mail message. Upon receipt of this e-mail message control system 26 deletes the previous outgoing announcement from memory 22 and stores the attached voice message file as a new announcement in memory 22.

E-mail command messages may also be used to cause answering machine 12 to place a telephone call and play a recorded message. For example, the command "dial <telephone number>" may be used to cause answering machine 12 to go off-hook on telephone line 16 and dial the specified digit string, either immediately or after disconnecting from ISP 30. A "play message <message number>" command may then be used to cause answering machine 12 to play a specified message over telephone line 16, or alternatively over its own speaker. A "hang up" command may be used to cause answering machine to go on-hook on telephone line 16, thus ending the call originated with the "dial" command. The "dial" and "hang up" commands are preferably contained in the same e-mail message to ensure that answering machine 12 does not remain off-hook indefinitely.

Yet another exemplary command is a "code execute" command. This command may be used to cause a microprocessor within answering machine 12 to execute code included with the e-mail message. The code to be executed may be attached as a file using, for example, standard MIME format, and may be written in any language which the microprocessor is capable of interpreting. Thus, the attached code may, for example, be written in machine language, Java, FORTH, or any other computer language.

Yet another exemplary command is a "firmware upgrade" command. This command may be used to upgrade firmware contained in, for example, a flash memory (not shown) within answering machine 12. The e-mail command message may include an attached binary file representing a new image for the flash memory. Upon receipt of this e-mail message, control system 26 erases the flash memory and writes the new image into memory. This command provides an easy method for upgrading answering machine 12.

The foregoing exemplary commands are not intended as an exhaustive list of possible commands. Other commands suitable for transmission by e-mail may be readily apparent to one skilled in the art.

Returning to FIG. 2, at step 60 control system 26 processes all e-mail command messages. Control system 26 first inspects each command message to determine the sender of the message. Control system 26 compares the sender to a stored list of bona fide senders specified by the user during setup of answering machine 12. Control system 26 is thereby able to verify that the message is a bona fide command message. Other authentication information may also be required in the e-mail message before the command will be executed by answering machine 12. Upon the completion of this verification, control system 26 inspects the body of the e-mail message and any attached files, and executes any commands contained in the e-mail message. Control system 26 preferably deletes each e-mail command message after executing the commands contained therein.

In the foregoing description, a single e-mail account 31 at ISP 30 was utilized to provide electronic access to answering machine 12. However, it will be appreciated that electronic administration of e-mail and voice messages may be simplified through the use of two or more e-mail accounts. Thus, in an alternative embodiment of the invention, e-mail account 31 comprises two separate accounts, one designated for e-mail command messages and the other designated for voice messages.

In this embodiment, when a stimulus to access ISP 30 is received at step 50 shown in FIG. 2, answering machine 12 accesses the voice message account in steps 52 through 56. When new e-mail messages are generated at step 64, with or without voice message attachments, these messages are transmitted to the voice message account for later retrieval by the user. At steps 58 and 60, answering machine 12 accesses the command message account and processes any command messages contained therein as previously described.

The user may then access the voice messages at the voice message account, and may generate command messages at the command message account. In this embodiment, e-mail messages containing commands are kept separate from e-mail messages containing voice messages, thus simplifying the administration of the respective e-mail accounts.

It will be understood that, in the foregoing discussion, the phrase "voice messages" as applied to messages left on answering machine 12 also includes any messages recorded using the "memo" button on answering machine 12. Thus, the "memo" button and the "store message" e-mail command allow a user to communicate verbally with another member of the household without completing a telephone call. Answering machine 12 can therefore be used as a toll-free voice mail system for a household.

It will also be understood that, although telephone connections to ISP 30 have been used herein to illustrate the invention, personal computer 32 may be connected to the Internet via a permanent connection such as a cable modem, a local area network (LAN) connection, or some other Internet connection means. Likewise, answering machine 12 may have a cable modem, LAN, or other Internet connection in place of computer-telephone interface 18 and telephone line 17. Such Internet connections are well known to those skilled in the art, and understood to be within the scope of the present invention.

Having thus described the preferred embodiments, persons skilled in the art will recognize that changes may be made in form and detail without departing from the spirit and scope of the invention. Thus the invention is limited only by the following claims.

What is claimed is:

1. An answering machine comprising:
    a telephone line interface coupled to a first telephone line and operable to detect an incoming call on the first telephone line;
    a computer-telephone interface coupled to a second telephone line, the computer-telephone interface being collocated with the telephone line interface;
    a memory operable to store digital data, the memory being collocated with the telephone line interface;
    a voice signal processing system operable to process a voice signal and generate voice signal data, and operable to store the voice signal data in the memory, the voice signal processing system being collocated with the telephone line interface; and
    a control system in communication with and collocated with the telephone line interface, the computer-telephone interface, the memory and the voice signal processing system, the control system being operable to receive a notification of the incoming call from the telephone line interface, and operable to cause the telephone line to create an off-hook condition on the first telephone line in response to the incoming call, and operable to retrieve an announcement from the memory, and operable to play the announcement on the first telephone line in response to the incoming call, and operable to cause the voice signal processing system to process a voice message during the incoming call and store the voice message in the memory, and operable to cause the computer-telephone interface to access an electronic mail account, and operable to generate an electronic mail message including the voice message stored in the memory at the electronic mail account, the control system being further operable to receive a command message from the user account and to execute the command message.

2. An electronically accessible answering machine, comprising:

a memory operable to store a voice message from a caller;

a control system operable to store information associated with a user account, and operable to transmit selected portions of the information associated with the user account to a user account provider to obtain access to the user account, and operable to access the memory and generate an electronic mail message including the voice message, the control system being further operable to receive a command message from the user account and to execute the command message; and a user-accessible manual interface operable to initiate playback of the voice message in response to manual user input, wherein the control system is operable to store a user name and password associated with the user account and a telephone number associated with the user account provider, and operable to dial the telephone number associated with the user account provider, and operable to transmit the user name and password to the user account provider to obtain access to the user account.

3. The electronically accessible answering machine of claim 2, further comprising a computer-telephone interface coupled to a telephone line and operable to provide an interface between the control system and the user account provider.

4. The electronically accessible answering machine of claim 2, wherein the control system is operable to dial the telephone number associated with the user account provider in response to the incoming call.

5. An electronically accessible answering machine, comprising:

a memory operable to store a voice message from a caller;

a control system collocated with the memory system, the control system being operable to store information associated with a user account, and operable to transmit selected portions of the information associated with the user account to a user account provider to obtain access to the user account and operable to access the memory and generate an electronic mail message including the voice message, the control system being further operable to receive a command message from the user account and to execute the command message; and a user-accessible manual interface collocated with the memory system and the control system, the manual interface being operable to initiate playback of the voice message in response to manual user input.

6. The electronically accessible answering machine of claim 5, further comprising a telephone line interface coupled to a telephone line and operable to detect an incoming call on the telephone line, and operable to notify the control system of the incoming call, wherein the control system is further operable to cause the telephone line interface to go off-hook in response to the incoming call.

7. The electronically accessible answering machine of claim 6, wherein the control system is further operable to access an announcement stored in the memory, and operable to transmit the announcement over the telephone line in response to the incoming call.

8. An electronically accessible answering machine, comprising:

a memory operable to store a voice mail message from a caller;

a control system operable to store information associated with a user account, and operable to transmit selected portions of the information associated with the user account to a user account provider to obtain access to the user account, and operable to access the memory and generate an electronic mail message including the voice message, the control system being further operable to receive a command message from the user account and to execute the command message; and a user-accessible manual interface operable to initiate playback of the voice message in response to manual user input, wherein the control system is operable to maintain a timer expiring at a predetermined time interval, and operable to dial the telephone number associated with the user account provider in response to the expiration of the timer.

9. An electronically accessible answering machine, comprising:

a memory operable to store a voice message from a caller;

a control system operable to store information associated with a user account, and operable to transmit selected portions of the information associated with the user account to a user account provider to obtain access to the user account, and operable to access the memory and generate an electronic mail message including the voice message, the control system being further operable to receive a command message from the user account and to execute the command message; and a user-accessible manual interface operable to initiate playback of the voice message in response to manual user input, wherein the user-accessible manual interface further comprises a connect button, wherein the control system is operable to dial the telephone number associated with the user account provider in response to the connect button being pressed.

10. A method for providing remote access to an answering machine located on a user's premises, comprising:

storing an incoming voice message by the answering machine in a memory located on the user's premises;

establishing a connection to a user account provider by the answering machine;

transmitting user account information by the answering machine to the user account provider to obtain access to a user account;

generating an electronic message including the incoming voice message in the user account; and executing a command message received from the user account.

11. The method of claim 10, wherein the step of generating the electronic message in the user account further comprises generating a message header associated with the voice message.

12. The method of claim 10, wherein the step of storing incoming voice message further comprises:

answering an incoming telephone call from a caller by the answering machine; and processing a voice signal from the caller by the answering machine to generate the incoming voice message.

13. The method of claim 10, further comprising storing caller identification information associated with the incoming voice message by the answering machine in the memory.

14. The method of claim 10, further comprising storing information associated with a time of the incoming voice message by the answering machine in the memory.

15. The method of claim 13, wherein the step of generating the electronic message in the user account further comprises generating a message header including the caller identification information.

16. The method of claim 14, wherein the step of generating the electronic message in the user account further comprises generating a message header including the information associated with the time of the incoming voice message.

* * * * *